Dec. 22, 1942.  S. E. B. SODERBERG  2,305,933
REDUCING VALVE
Filed Jan. 17, 1939  2 Sheets-Sheet 1

INVENTOR
Sten E. B. Soderberg
BY
O. V. Thien
ATTORNEY

Dec. 22, 1942.  S. E. B. SODERBERG  2,305,933
REDUCING VALVE
Filed Jan. 17, 1939  2 Sheets-Sheet 2

INVENTOR
Sten E. B. Soderberg
BY
ATTORNEY

Patented Dec. 22, 1942

2,305,933

UNITED STATES PATENT OFFICE 2,305,933

REDUCING VALVE

Sten E. B. Soderberg, Passaic, N. J., assignor to Leslie Company, Lyndhurst, N. J.

Application January 17, 1939, Serial No. 251,324

3 Claims. (Cl. 236—85)

The present invention relates to pressure regulating valves.

In my copending application, Serial No. 250,680 filed on January 13, 1939, I have disclosed and claimed an improvement in the pilot valve used for example in certain types of pressure regulating valves. As there described, the apparatus operates in response to variations in the pressure on the "reduced pressure" side or outlet side of the regulating valve.

Where the fluid whose pressure is regulated is a heating medium, such as steam, used to raise the temperature of water, e. g., it is desirable for some installations, to have the regulating valve act normally in response to pressure variations on its outlet side but to have such action suspended or made ineffective by thermostatically governed means responsive to the temperature of the water being heated, whenever this temperature exceeds a predetermined amount. Thus, we may for example have a pressure of 100 lbs. per sq. in. in the steam main from which the heating steam is taken. The regulating valve normally may reduce this to a pressure such as 4 lbs. per sq. in., the reduced pressure steam flowing to a coil submerged in the water to be heated. The maximum temperature to which the water is to be heated may be 180° F. As long as this temperature is not exceeded the regulating valve is to furnish steam at 4 lbs. per sq. in. But when the temperature reaches 180° F. the steam supply to the heating coil is to be cut off by thermostatically actuated means and to remain shut off until the temperature again drops to 180° F.

The object of the present invention is to provide an improved apparatus for this purpose.

Figure 1:
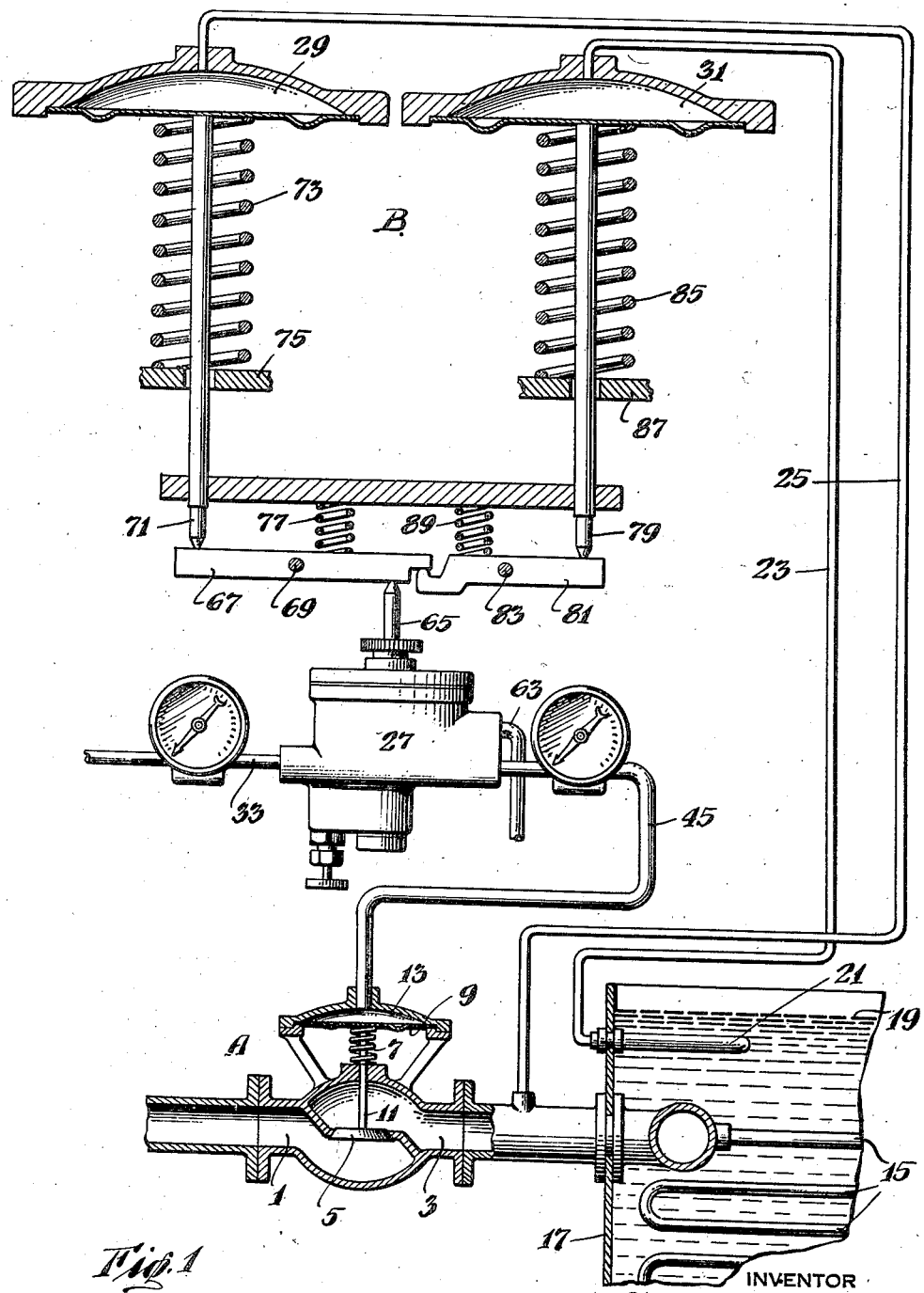
Figure 2:
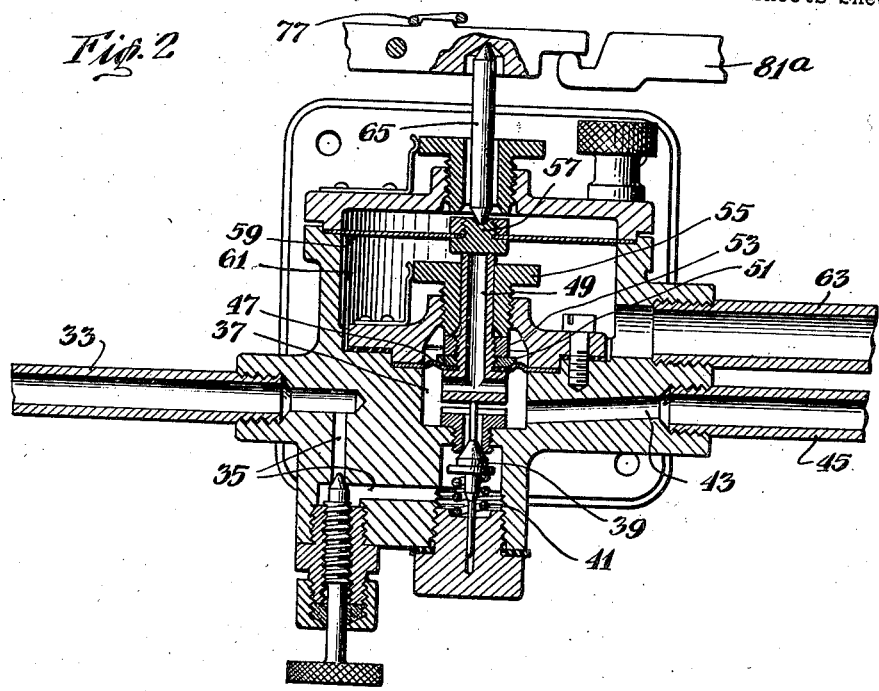
Figure 3:
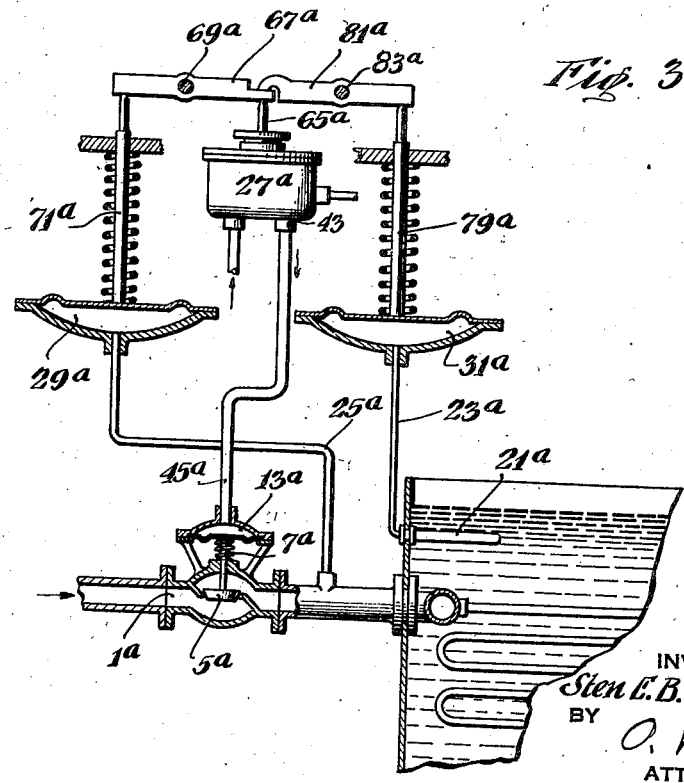

In describing the invention, reference will be made to the accompanying drawings, of which Fig. 1 is a schematic elevation, parts being in section, showing the general arrangement of elements employed in one form of apparatus carrying out the invention; Fig. 2 is an enlarged view partly in section of the pilot valve of the apparatus of Fig. 1; and Fig. 3 is a view similar to that of Fig. 1 of a variation.

Referring first to Figs. 1 and 2, the regulating valve, generally designated by reference letter A, receives high pressure steam at its inlet 1, and discharges this steam at reduced pressure at its outlet 3. In this form of the apparatus the regulating valve 5 closes in a direction with the steam flow, in which direction it is urged by spring 7 acting on diaphragm 9 to which valve stem 11 is secured. Pressure in diaphragm chamber 13 acting in opposition to spring 7 tends to open valve 5.

The reduced pressure steam is led to a heating coil 15 in tank 17 where it heats water or other liquid whose level is indicated at 19. Thermostat element 21 furnishes the temperature responsive impulse for the pilot valve, and pressure on the outlet side of the regulator A furnishes the pressure responsive impulse. These impulses are carried through pipes 23 and 25 respectively to the pilot valve mechanism, designated generally by the reference letter B.

Pilot valve B comprises the valve, housed in casing 27, two diaphragm chambers 29 and 31, and mechanism operatively connecting the diaphragms of these chambers to the valve.

The details of the pilot valve are not claimed herein, and it will be clear from the following description that it is not essential to a practice of the present invention that a pilot of this particular form be used, although the form shown is the preferred one.

Auxiliary pressure fluid, which may be of any desired nature, for example compressed air, or steam, in the latter case advantageously taken from the same source as the steam entering the regulating valve at 1, is furnished to the pilot valve through line 33. It flows through passage 35 (see Fig. 2) to chamber 37, its flow being controlled by valve 39, which is urged upward toward its seat by light spring 41. Chamber 37 is in communication with diaphragm chamber 13 of regulating valve A by means of outlet 43 and pipe 45.

The top of chamber 37 is closed by diaphragm 47, through which extends nozzle 49, which is secured to the diaphragm by means of washer 51 and lock nut 53. The nozzle fits slidably in guide nut 55, the lower end of which forms an adjustable stop for lock nut 53. The upper or outlet end of the passage through nozzle 49 is controlled by disk valve 57, carried by diaphragm 59, which forms the top closure of chamber 61 with which the nozzle passage communicates when valve 57 is open and from which extends pipe 63 to any appropriate point of discharge.

A stem extending upwardly from valve 39 is engaged by the lower end of nozzle 49 to open valve 39.

Disk valve 57 and diaphragm 59 are acted on in a downward direction by rod 65, whose upper end engages lever 67 on one side of its fulcrum 69, the opposite end of the lever being engaged by rod 71, whose upper end is secured to the diaphragm of diaphragm chamber 29. Pressure in the diaphragm chamber 29 urges the rod 71 downward, such motion being opposed by spring 73. The pressure of the spring is adjustable by means indicated at 75. A spring 77 keeps lever 67 in engagement with the lower end of rod 71.

The diaphragm of chamber 31 has rod 79 extending downwardly from it, engaging with its lower end lever 81 on one side of fulcrum 83. The opposite end of the lever engages the under side of lever 67. Spring 85 opposes downward movement of the diaphragm, the force with which it does so being adjustable by means of mechanism shown at 87. A spring 89 keeps lever 81 in engagement with rod 79.

The operation of the device is as follows:

With no steam being delivered at 1 to regulating valve and no auxiliary fluid to the pilot valve, and the temperature of the water to be heated below that at which the thermostatic element is called into action, the position of the parts will be the following:

No pressure existing in outlet 3, the diaphragm of diaphragm chamber 29 will exert no downward pressure on rod 71, spring 73 forcing the diaphragm up, thereby permitting spring 77 to push rod 65, disk valve 57 and nozzle 49 downward to open valve 39. Disk valve 57 is thus closed and valve 39 open.

There being no auxiliary pressure fluid, there will be no pressure in diaphragm chamber 13 and spring 7 will keep valve 5 closed.

The temperature of the water to be heated being such as not to actuate the diaphragm of diaphragm chamber 31, spring 85 will force the diaphragm upward and allow springs 89 to keep lever 81 out of engagement with lever 67.

If now the heating fluid is admitted at 1 and auxiliary operating fluid at 33, the pilot valve 39 being in its open position will allow auxiliary fluid to flow to chamber 37 and thence to diaphragm chamber 13. Disk valve 57 is shut and prevents escape of the fluid through nozzle 49 and discharge 63. The pressure on diaphragm 9 overcomes the force of spring 7 and opens valve 5, so that pressure builds up in 3 and coil 15, which pressure is transmitted by pipe 25 to diaphragm chamber 29. When this pressure is such as to overcome the force of spring 73, rod 71 will force its end of lever 67 down, and the opposite end up, whereby spring 41 is enabled to move valve 39, nozzle 49, disk valve 57 and rod 65 up until valve 39 seats. This cuts off the flow of further auxiliary fluid to diaphragm chamber 13, so that valve 5 will be opened no farther. If with valve 5 in the position it then has the pressure in 3 and coil 15 continues to rise, this increased pressure will cause the diaphragm of chamber 29 to move rod 71 down a little further, compressing spring 77 a little more and allowing pressure of the fluid within nozzle 49 on the surface of disk valve 57 exposed to such pressure to open this disk valve, thereby discharging some of the auxiliary fluid which was trapped by the closure of valve 39. The resulting drop in pressure on diaphragm 9 permits spring 7 to move valve 5 in a closing direction thereby reducing the flow and the pressure at outlet 3. When the right pressure at 3 has been reached, valve 57 will close, and the trapped auxiliary fluid will hold valve 5 in its position.

If the pressure at 3 drops below the point for which the mechanism is set, the reduced pressure in diaphragm chamber 29 will evidently allow spring 77 to open valve 39 to admit more auxiliary fluid to chamber 13 and to open valve 5 more.

As far as described, this action is precisely like that of the apparatus described in my said copending application, Serial No. 250,680, and no claim to this much of the apparatus per se is made herein. The inventive idea which it is desired to protect herein resides in the thermostatic portion whose action will be next stated.

If for any reason, for example reduction in the rate at which hot water is withdrawn from tank 17, the temperature of the water in the tank rises to too high a point, it is desirable to call into action thermostatic means to cut off the supply of the heating steam instead of relying wholly on mechanism cutting down the pressure of such supply. This is advisable because the pressure responsive means keep supplying heating medium at the predetermined pressure, no matter how high the temperature of the water is.

When the temperature of the water reaches the desired point, the pressure transmitted by pipe 23 from bulb 21 to diaphragm chamber 31 will force rod 79 downward against compression spring 85 and thereby will lift the right end of lever 67 (as viewed in the drawings) upward against spring 77, thereby allowing valve 39 to close and valve 57 to open. This throws the pressure responsive part of the pilot valve out of action, and valve 5 will close entirely and will remain closed until the temperature of the water drops sufficiently to allow lever 81 to get out of its engagement with lever 67, after which the normal pressure responsive action is resumed.

The above described apparatus is of the type in which the regulating valve is closed by a spring and is opened by the auxiliary pressure, this type being commonly referred to as "reverse acting." The invention is not limited to this type however, but may be used also with so-called "direct acting" types, in which auxiliary fluid pressure closes and a spring opens the regulating valve. The diagrammatic showing of Fig. 3 will illustrate a convenient arrangement of this type.

The parts within the pilot housing 27a are identical with those in casing 27 of the form first described. Mainly for reasons of compactness of the whole device, diaphragm chambers 29a and 31a are here in an inverted position as compared with that of the corresponding parts in Fig. 1, the stems 71a and 79a extending upwardly and engaging the outer ends of levers 67a and 81a, respectively, which are fulcrumed at 69a and 83a. The opposite or inner end of lever 67a engages stem 65a with its lower side, and engages the free inner end of lever 81a with its upper side.

Regulating valve 5a closes against the steam pressure entering at 1a, being urged toward its seat by fluid pressure delivered by pipe 45a from the pilot valve to diaphragm chamber 13a, spring 7a acting resiliently in the opposite direction. Line 25a transmits delivery pressure to diaphragm chamber 29a and diaphragm chamber 31a receives its impulse through pipe 23a from thermostatic bulb 21a, located in the body of the liquid being heated.

With this much said it is believed that the action of this form will at once be clear. Variations of pressure in the outlet of the regulating valve will cause the outer end of lever 67a to move up or down as the case may be and thereby to adjust the pressure above the diaphragm in chamber 13a to the correct position and so to place valve 5a into its proper position. If the temperature of the water rises to the predetermined maximum point the thermostatic element will cause rod 79a to move the left end of lever 81a downward carrying with it lever 67a, and thus to close valve 57 (see Fig. 2) and to open valve 39. This admits full auxiliary pressure to diaphragm chamber 13a thereby moving valve 5a toward closed position. The valve will remain closed until the temperature falls sufficiently to allow lever 81a to cease exerting force in a downward direction on lever 67a, whereupon normal operation responsive only to pressure at the outlet of valve 5a is resumed.

It will be understood that some parts of the apparatus described are not necessarily shown of forms best adapted for actual use. This is true particularly of the regulating valves. In practice these are preferably made of some permanently balanced form, or of a form provided with means to balance the valve before opening it. This will be obvious to those skilled in this art, and it is thought inadvisable to encumber the case with any description of a specific form of such valve. Further, it is to be understood that the entire description of the apparatus and the use to which it is put is illustrative only, and that variations may in practice be made in both the apparatus and its application without thereby losing the spirit of the invention. The apparatus, for example, instead of being made responsive to an impulse varying with pressure and an impulse varying with temperature, may be made responsive to impulses from two different points both varying with temperature, or both varying with pressure. More generally, the two impulses may be of the same kind or nature, or may be of different kind or nature, and either or both may be other than temperature or pressure. It is thought unnecessary to enter into any greater detail or to illustrate this, as it will be entirely clear from this brief statement to those familiar with this art.

What I claim and desire to secure by Letters Patent is:

1. Apparatus of the character described comprising, in combination, a fluid pressure operated control valve, means including pilot valve mechanism for governing flow of valve operating fluid from an independent source to and from said control valve to position the same, said pilot valve mechanism including a diaphragm subject to the pressure of the valve operating fluid acting on said control valve and a movably mounted pilot valve actuating member, the movement of which in one direction is opposed by the pressure acting on said diaphragm, a first element movable in response to variations in the form of a primary regulating impulse indicative of a condition of a medium influenced by the action of said control valve, motion transmitting mechanism for moving said actuating member in accordance with movements of said first element, a second element movable in response to variations in the force of a secondary impulse indicative of a condition of a medium influenced by the action of said control valve, and motion transmitting mechanism for moving said actuating member in accordance with movements of said second element to render said first element ineffective under predetermined conditions to control said actuating member.

2. Apparatus in accordance with claim 1 in which the motion transmitting mechanism associated with said first element comprises a lever system and a loading spring acting in opposition to the fluid pressure exerted on said diaphragm, and the motion transmitting mechanism associated with said second element includes a lever system acting on the first mentioned lever system in opposition to said loading spring.

3. Apparatus in accordance with claim 1 in which the motion transmitting mechanism associated with said first element operates to move said actuating member in said one direction in opposition to the pressure acting on said diaphragm upon increase in the value of the primary impulse and the motion transmitting mechanism associated with said second element operates to move said actuating member in said one direction upon increase in the value of said secondary impulse to or above a predetermined value.

STEN E. B. SODERBERG.